(12) United States Patent
Mukherjee (10) Patent No.: US 12,198,018 B2
(45) Date of Patent: Jan. 14, 2025

(54) AMBIGUATING AND DISAMBIGUATING DATA COLLECTED FOR MACHINE LEARNING

(71) Applicant: BlackBerry Limited, Waterloo (CA)

(72) Inventor: Biswaroop Mukherjee, Stittsville (CA)

(73) Assignee: BlackBerry Limited, Waterloo (CA)

(*) Notice: Subject to any disclaimer, the term of this patent is extended or adjusted under 35 U.S.C. 154(b) by 1150 days.

(21) Appl. No.: 17/028,137

(22) Filed: Sep. 22, 2020

(65) Prior Publication Data

US 2022/0092468 A1  Mar. 24, 2022

(51) Int. Cl.
G06N 20/00 (2019.01)
G06N 5/04 (2023.01)
H04L 9/32 (2006.01)
H04L 9/40 (2022.01)

(52) U.S. Cl.
CPC ............ *G06N 20/00* (2019.01); *G06N 5/04* (2013.01); *H04L 9/3236* (2013.01); *H04L 63/0421* (2013.01)

(58) Field of Classification Search
CPC ................................ G06N 20/00; G06N 5/04
See application file for complete search history.

(56) References Cited

U.S. PATENT DOCUMENTS

| 2008/0005264 A1 | 1/2008 | Brunell et al. |
| 2014/0115715 A1 | 4/2014 | Pasdar |
| 2019/0354718 A1 | 11/2019 | Chandnani et al. |
| 2019/0370334 A1 | 12/2019 | Bhowmick et al. |
| 2020/0241991 A1 | 7/2020 | Patton et al. |

OTHER PUBLICATIONS

Justin Boyan et al: "A Machine Learning Architecture for Optimizing Web Search Engines" School of Computer Science, Carnegie Mellon University. May 10, 1996.
Mauro Ribeiro et al: "MLaaS: Machine Learning as a Service", Deprtment of Electrial and Computer Engineering Western University, London, Ontario, Canada N6A 5B9 {mribeir5, kgroling, mcapretz}@uwo.ca.
Extened European Search Report, EP Application No. 21192671.2 dated Feb. 7, 2022.
EP Office Action dated Aug. 12, 2024; EP Application No. 21192671.2.

*Primary Examiner* — Brian Whipple
(74) *Attorney, Agent, or Firm* — Rowand LLP (57) ABSTRACT

A method and privacy protection system for ambiguating and disambiguating data collected for machine learning. The method comprising receiving data from an endpoint, the data including identifying information for the endpoint and non-identifying information; obfuscating the identifying information in the received data to generate obfuscated data including the non-identifying information and obfuscated identifying information; transmitting the obfuscated data to one or more machine learning providers; receiving an actionable inference message based upon the non-identifying information in the obfuscated data from the one or more machine learning providers; resolving the obfuscated identifying information in the received actionable inference message to recover the identifying information; and transmitting the resolved actionable inference message to the endpoint associated with the identifying information. The privacy protection system comprising an endpoint, and obfuscator module, one or more machine learning modules, and a resolver module.

20 Claims, 5 Drawing Sheets

AMBIGUATING AND DISAMBIGUATING DATA COLLECTED FOR MACHINE LEARNING

FIELD

The present application generally relates to data privacy, and more particularly, to preserving privacy of data collected for machine learning.

BACKGROUND

Machine learning is heavily dependent on the collection of large amounts of data, in some cases from numerous or various sources. The efficacy of machine learning improves as more data is collected. While the amount of data being collected is ever increasing, there is also increasing awareness about misuse of data and other data privacy concerns. It would be preferable if there was a mechanism to provide only needed data to machine learning processes.

One instance where limiting data provided to machine learning processes may have a downside is utilizing actionable information, or inferences, obtained from the machine learning processes. If the information being hidden is exactly what allows end user devices to take action on an inference, then a large part of the benefit of using machine learning may be lost.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a method of ambiguating and disambiguating data collected for machine learning. The method may include receiving data from an endpoint, the data including identifying information for the endpoint and non-identifying information; obfuscating the identifying information in the received data to generate obfuscated data including the non-identifying information and obfuscated identifying information; transmitting the obfuscated data to one or more machine learning providers; receiving an actionable inference message based upon the non-identifying information in the obfuscated data from the one or more machine learning providers; resolving the obfuscated identifying information in the received actionable inference message to recover the identifying information; and transmitting the resolved actionable inference message to the endpoint associated with the identifying information.

In a second aspect, the present application describes a privacy protection system for ambiguating and disambiguating data collected for machine learning. The system may include an endpoint for transmitting data, the data including identifying information for the endpoint and non-identifying information; an obfuscator module for obfuscating the identifying information in the data to generate obfuscated data including the non-identifying information and obfuscated identifying information; one or more machine learning modules for receiving the obfuscated data and transmitting an actionable inference message based upon the non-identifying information in the obfuscated data; and a resolver module for resolving the obfuscated identifying information in the actionable inference message and transmitting the resolved actionable inference message to the endpoint associated with the identifying information.

In a third aspect, the present application describes a computer-readable storage medium storing processor-executable instructions that, when executed by a processor, cause the processor to perform any of the methods described herein. The computer-readable storage medium may be non-transitory. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As noted above, there is a need to allow only required information into a given machine learning module or process, while hiding unrequired identifying information. Equally, there is a need to take actionable inferences from the given machine learning module or process and direct them to the correct action endpoint.

Accordingly, in accordance with one aspect of the present application, a method of ambiguating and disambiguating data collected for machine learning is described. The method, in one example implementation, obscures identifying information in data received from an endpoint, and reconstructs the identifying information in order to direct an actionable inference from a machine learning module/process to the intended endpoint.

Identifying information inside datum can be obscured from learning or inference processes by an obscurer function as long as the incoming data conforms to an input specification that clearly identifies the identity fields, and the result can be associated back to the identity by a resolver function that reverses the obscuring. Typically, the obscuring function is applied when data leaves a trusted entity and the resolving function is applied when actionable inference is generated and received at a trusted entity.

Figure 1A:
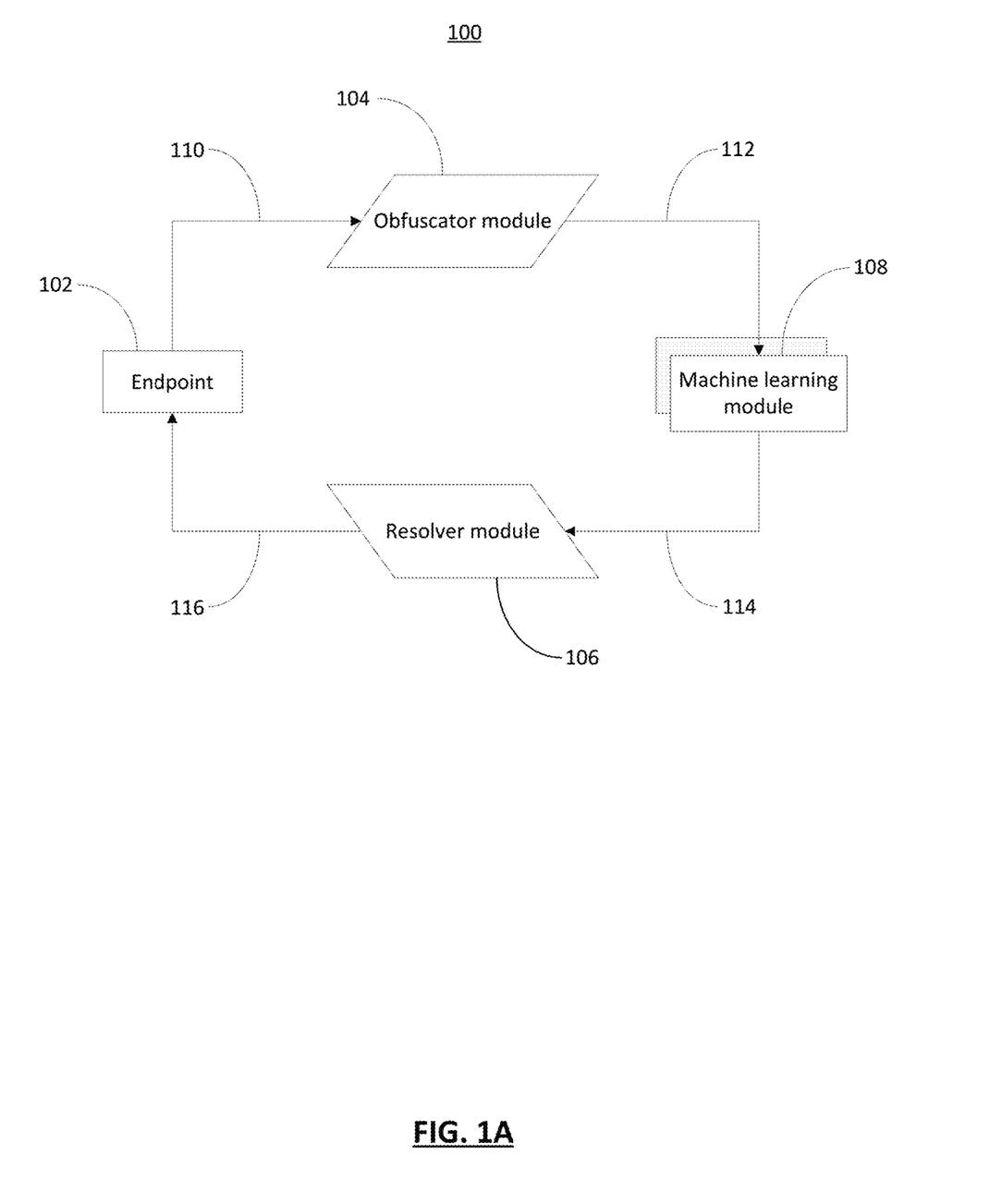
FIG. 1A illustrates, in block diagram form, an example privacy protection system for ambiguating and disambiguating data collected for machine learning.

Reference is now made to FIG. 1A, which illustrates an example privacy protection system 100 for ambiguating and disambiguating data collected for machine learning. The privacy protection system 100 includes an endpoint 102, an obfuscator module 104, a resolver module 106, and one or more machine learning modules 108. The endpoint 102 may be any computing device, user equipment, or software process/module, such as, for example, a mobile phone, personal computer, autonomous vehicle, or virtual machine. In one implementation, the endpoint 102 transmits data 110 to the obfuscator module 104. The data 110 may include identifying information for the endpoint 102. Such identifying information may be identification information regarding the endpoint 102 such as, for example, an IP address, IMEI, device identifier, vehicle identification number (VIN), or process ID. In some cases, the information may be identifying information for one or more users of the endpoint 102, such as a name, username, address, company/employer, employee ID, email, or social media handle. The data 110 may also include non-identifying information to be acted upon by the one or more machine learning modules 108. Examples of non-identifying information may include such diverse things as: device model, OS version, email spam reporting, battery behavior, vehicle environment data, etc.

The obfuscator module 104 obfuscates the identifying information in the data 110 received from the endpoint 102. Obfuscating refers to reversibly removing and replacing, or otherwise hiding, identifying portions of the data 110, as further discussed in relation to FIG. 2. The resulting obfuscated data 112 includes both the non-identifying information (as originally received) and obfuscated identifying information. In one scenario, the endpoint 102 itself may select a level of privacy to be applied to the data 110. For example, the endpoint 102 may choose a first privacy level in which all identifying information is to be obfuscated, or a second privacy level in which all identifying information except for selected information is to be obfuscated. The endpoint 102 may send configuration information to the obfuscator module 104 and the resolver module 106 so that those modules 104, 106 are configured to obscure the identifying information selected by the endpoint 102. The configuration information may be sent prior to or together with the data 110. In some instances, the configuration information may be an index selection of one or more predefined obfuscation policies.

In another scenario, the privacy protection system 100 (or a subsystem thereof) may make such determinations, such as, for example, by the obfuscator module 104 and resolver module 106. In some cases, an administrative policy may be set for all endpoints 102 from which the obfuscator module 104 receives data 110 defining what identifying information is to be obscured.

One or more machine learning modules 108 receives the obfuscated data 112 from the obfuscator module 104. The obfuscated data 112 may be used by the one or more machine learning modules 108 for training purposes in addition to inference derivation. In some instances, the one or more machine learning modules 108 may generate an inference from data input to the trained model. That is, the machine learning module 108 may produce a decision or outcome from the input data based on its model. In some cases, that decision or outcome may indicate that a certain state or condition exists with respect to an endpoint. In some cases, the decision or outcome may further be associated with a specific action or mitigation that the endpoint may implement with regard to the state or condition.

In some cases, the machine learning module 108 may transmit an actionable inference message 114 to an endpoint. It does not have any identifying information for the endpoint since it was obfuscated, so it directs the actionable inference message 114 to the associated resolver module 106. The actionable inference message 114 may be an inference derived by the one or more machine learning modules 108 and, in some cases, may include at least one action to be taken by the endpoint. The actionable inference message 114 may be formatted in a manner that is compatible with and understood by the endpoint 102 in some cases. In some cases, the actionable inference message 114 may be formatted in a manner that is compatible with and understood by the resolver module 106, which is configured to translate the actionable inference message 114 in terms of its format and/or content to be received by and understood by the endpoint 102.

In order to identify the specific endpoint to which the message is to be sent, the resolver module 106 resolves the obfuscated identifying information in the actionable inference message 114 and transmits the resolved actionable inference message 116 to the endpoint 102 associated with the identifying information. Resolving refers to replacing obfuscated identifying information with the original identifying information, i.e. associating back to identifying portions of the data 110, as further discussed in relation to FIG. 2.

Figure 1B:
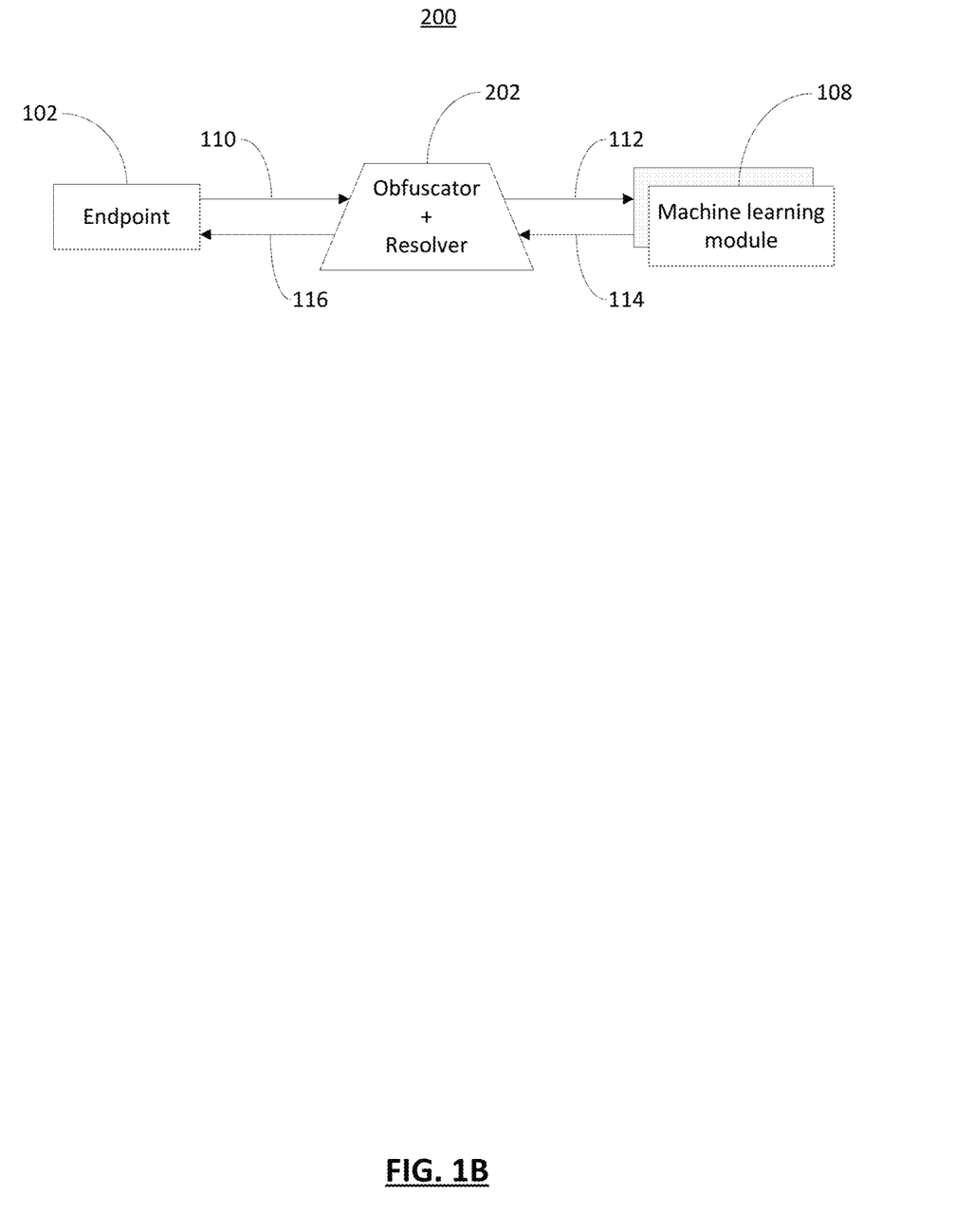
FIG. 1B illustrates, in block diagram form, an alternative embodiment of the example privacy protection system for ambiguating and disambiguating data collected for machine learning.

Reference is now made to FIG. 1B, which illustrates an alternative privacy protection system 200 for ambiguating and disambiguating data collected for machine learning. This example implementation is similar to the system 100 of FIG. 1A in that it also includes an endpoint 102 and one or more machine learning modules 108. However, in this privacy protection system 200 the obfuscator module and the resolver module are collocated in a single obfuscator+resolver module 202. The endpoint 102 transmits data 110 to the obfuscator+resolver module 202 for obfuscation of identifying information in the data 110. The obfuscator+resolver module 202 obfuscates the identifying information in the data 110 to generate obfuscated data 112 including the non-identifying information and obfuscated identifying information. One or more machine learning modules 108 receive the obfuscated data 112 and, in this example, transmit an actionable inference message 114 based upon the non-identifying information in the obfuscated data 112. The obfuscator+resolver module 202 resolves the obfuscated identifying information in the actionable inference message 114 and transmits the resolved actionable inference message 116 to the endpoint 102 associated with the identifying information.

The obfuscator module 104 (FIG. 1A), the resolver module 106 (FIG. 1A), and/or the obfuscator+resolver module 202 (FIG. 1B) may each be implemented by a computing device having suitable computer-executable instructions for causing the computing device to carry out the described operations. The modules 104, 106, 202 may be implemented as a software application or module executed by one or more processors. The instructions, when executed, cause the processors and/or other components of the computing devices to perform the described operations.

It will be appreciated that the components of both privacy protection system 100 of FIG. 1A and alternative privacy protection system 200 of FIG. 1B can communicate over one or more networks. That is, the endpoint 102 may be configured to communicate with the obfuscator module 104 and the resolver module 106 (or combination obfuscator+resolver module 202) over such network(s). Likewise, the obfuscator module 104 and the resolver module 106 (or combination obfuscator+resolver module 202) may be configured to communicate with the one or more machine learning modules 108 over such network(s). The network(s) can include a plurality of interconnected wired and wireless networks, including the Internet, local area networks, wide area networks, or the like.

Figure 2:
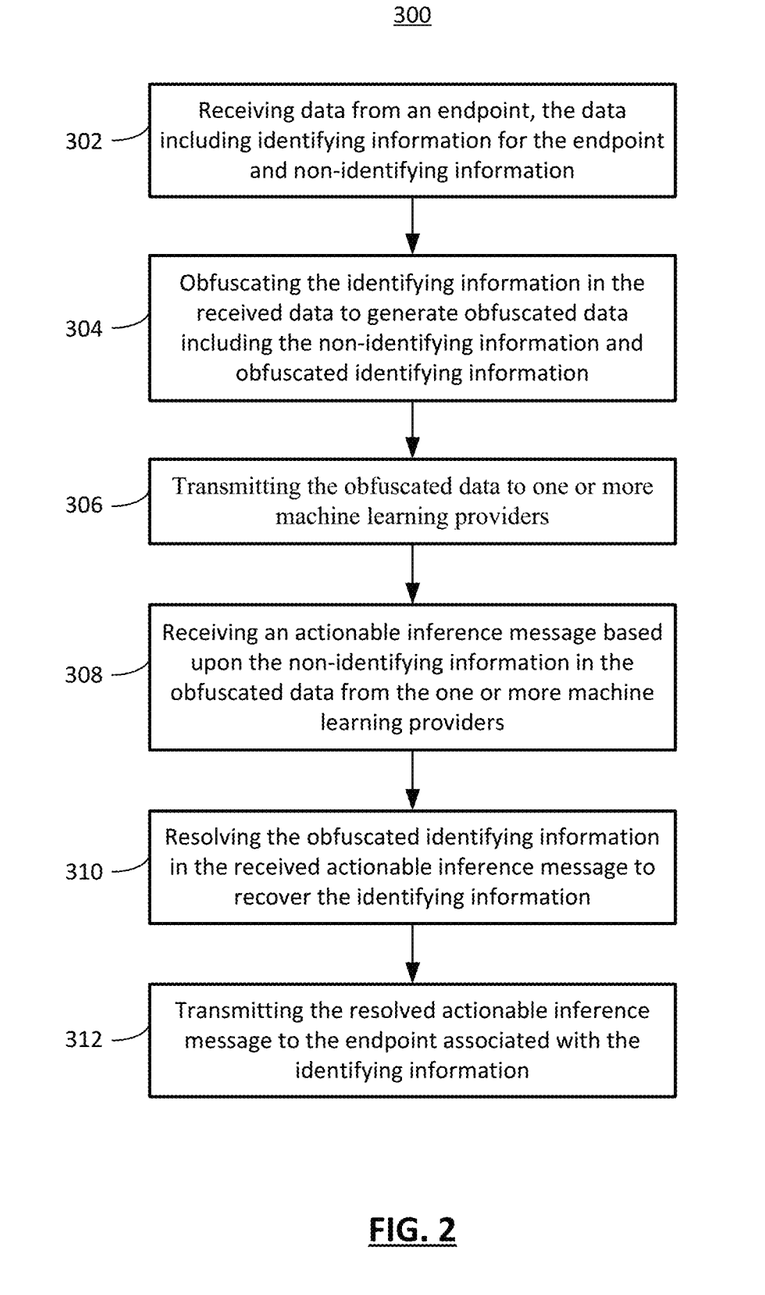
FIG. 2 shows, in flowchart form, an example method of ambiguating and disambiguating data collected for machine learning.

Reference is now made to FIG. 2, which shows a method 300 of ambiguating and disambiguating data collected for machine learning in accordance with an example of the present application. The method 300 may be implemented by one or more computing devices having suitable computer-executable instructions for causing the computing device(s) to carry out the described operations. The instructions may be implemented by way of a software module or application executing on a computing device. Portions of the method 300 may be carried out by a privacy protection system as depicted in FIG. 1A or 1B and, in particular, by the obfuscator module 104 (FIG. 1A), the resolver module 106 (FIG. 1A), and/or the obfuscator+resolver module 202 (FIG. 1B).

At operation 302, the method 300 includes receiving data from an endpoint, the data including identifying information for the endpoint and non-identifying information.

For example, a machine learning process for predicting behavior of batteries is best served by acquiring training data from as many batteries as possible. In order to train a useful model, the machine learning process may want to learn certain information, such as, for example, mobile phone model number, OS version, screen on/off time, length of music streaming time, etc. It may be undesirable and unnecessary, however, for the machine learning process to know personally identifying information, such as the mobile phone number, or user account information. Thus, identifying information for a particular mobile phone may accompany the non-identifying information and, in one example, may take the form of an object like so:

```
phoneidArtifact {
    string phoneNumber;
    string imei;
    string accountEmail;
    string ipaddress;
}
```

At operation 304, the method 300 includes obfuscating the identifying information in the received data to generate obfuscated data including the non-identifying information and obfuscated identifying information.

In one example embodiment, obfuscating the identifying information in the received data includes replacing the identifying information by a token. In such an example, the system may store the token in association with the identifying information in memory. The token may be generated using a cryptographic hash in some cases. In one example, the token is generated by hashing the identifying information.

In another example embodiment, obfuscating the identifying information in the received data includes replacing the identifying information by an encrypted string generated using one of symmetric or asymmetric encryption. If asymmetric encryption is used, the obfuscator process can choose to generate the encrypted string to be recoverable for a specific resolver process by knowing the public key of the resolver process. If symmetric encryption is used, mechanisms to share the key between the obfuscator and resolver may be employed, unless they are collocated as in the embodiment of FIG. 1B.

In the battery behavior example, the identifying information object (above) may be replaced by an obscured object of the form:

```
opaqueArtifact {
    string scope;
    optional string idToken;
    optional string encryptedId;
}
```

In one implementation, the obfuscated data (opaqueArtifact) is generated to include a resolving identifier (scope), where the resolving is associated with the obfuscating by the resolving identifier and the identifier points to the associated resolving via, for example, a URL, or directory lookup.

At operation 306, the method 300 includes transmitting the obfuscated data to one or more machine learning providers. In the example, the opaqueArtifact does not reveal anything about the identity of the generating process (mobile phone) to the machine learning process. Thus, the machine learning process is exposed only to the scope, and no other identifying information.

At operation 308, the method 300 includes receiving an actionable inference message based upon the non-identifying information in the obfuscated data from the one or more machine learning providers.

In the battery behavior example, the one or more machine learning providers may have determined that a battery condition or state exists on the mobile phone and that the mobile phone is to be notified. In some cases, the machine learning providers may have determined that a certain action is to be taken to mitigate the battery condition or state. In some examples, the machine learning providers may have identified a specific process or condition that is a cause of the battery state or condition and the action may include an action relating to the specific process or condition. The specific process or condition may be a process operating on the mobile phone that is causing a fast battery drain condition, in one example, such as a bitcoin mining process. In some cases, the actionable inference message may include a notification or condition. In some cases, the actionable inference message may include an inference as to the cause of the condition, e.g. the specific process at fault. In some cases, the actionable inference message may prescribe an action. The action may, for example, be an interdiction to kill a bitcoin mining process on the mobile phone. Accordingly, an actionable inference message may be transmitted by the machine learning provider and received by a resolver.

At operation 310, the method 300 includes resolving the obfuscated identifying information in the received actionable inference message to recover the identifying information. The resolver process has a matching scope to the corresponding obfuscator process.

In one example embodiment, if the identifying information has been replaced by a token, resolving the obfuscated identifying information to recover the identifying information includes replacing the token with the identifying information using a stored mapping. The mapping may be stored in memory local to the resolver process. The mapping may be stored in a remote storage to which the resolver process has secure access in some cases. The mapping may be stored outside the resolver itself but within its secure domain.

In another example embodiment, if the identifying information has been replaced by an encrypted string, resolving the obfuscated identifying information to recover the identifying information may include decrypting the encrypted string to recover the identifying information. The decryption may involve using symmetric or asymmetric decryption. It may further include replacing the encrypted string with the identifying information. In the above example, the resolver process can use a decryption key, indexed by the scope, to recover the identifying information, such as phoneidArtifact.

At operation 312, the method 300 includes transmitting the resolved actionable inference message to the endpoint associated with the identifying information. That is, the resolved actionable inference message may be addressed to the endpoint using the resolved identifying information of the endpoint. In the battery behavior example, the resolved identifying information, such as phoneNumber or ipaddress may be used for transmitting the resolved actionable inference message.

Figure 3:
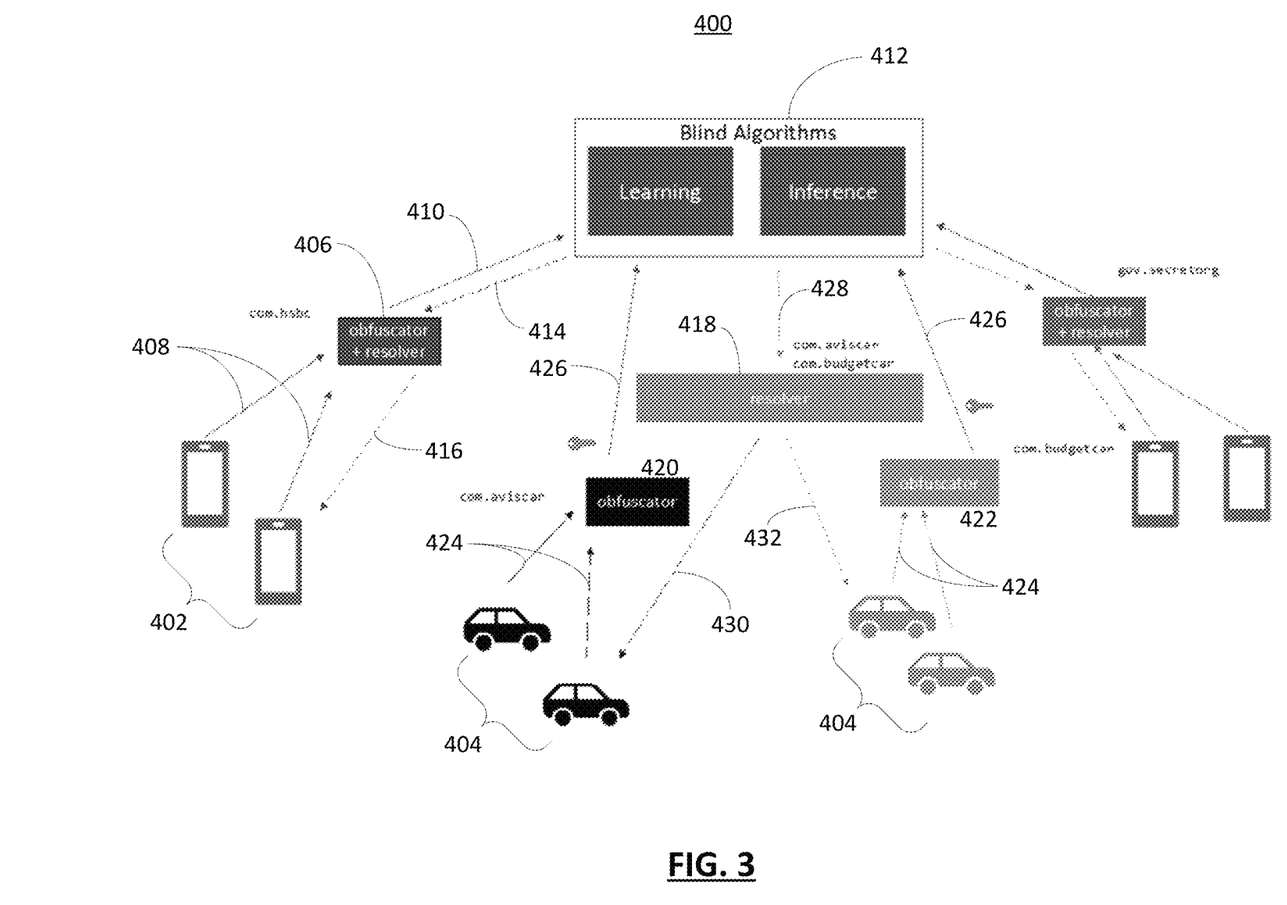
FIG. 3 illustrates, in schematic form, an example privacy protection system implementing the embodiments of both FIG. 1A and FIG. 1B.

Reference is now made to FIG. 3 which illustrate an example privacy protection system 400 implementing the embodiments of both FIG. 1A and FIG. 1B. As shown, nodes 402, 404 represent the endpoints from which data is being collected. An actionable inference message may be intended for any one of the endpoints. The obfuscators and resolvers are shown at the two levels above the nodes 402, 404. Two different implementations of the method and system according to the present application are illustrated.

First, the bank domain (com.hsbc) resolver is collocated at a same layer with the obfuscator as obfuscator+resolver 406. In this case all of the data 408 collected from a mobile phone 402 that is sent to the bank domain can be obfuscated at obfuscator+resolver 406, and the obfuscated data 410 sent out to a third-party machine learning provider 412 ("Blind Algorithms") When the third-party machine learning provider 412 has an actionable inference message 414 ready, the actionable inference message 414 is sent back to obfuscator+resolver 406. At this point the actionable inference message 414 is resolved and the actual intended endpoint is identified, outside of the third-party machine learning provider 412. Finally, the resolved actionable inference message 416 is sent to the appropriate endpoint (in this case mobile phone 402).

Second, the auto rental domain (com.aviscar/com.budgetcar) resolver 418 is independent of both obfuscator 420 for domain (com.aviscar) and obfuscator 422 for domain (com.budgetcar). In this case all of the data 424 collected from a car 404 belonging to either Avis or Budget that is sent to the auto rental domain can be obfuscated at its respective obfuscator 420, 422, and the obfuscated data 426 sent out to the third-party machine learning provider 412 ("Blind Algorithms"). When the third-party machine learning provider 412 has an actionable inference message 428 ready, the actionable inference message 428 is sent to common resolver 418. At this point the actionable inference message 428 is resolved and the actual intended endpoint is identified, outside of the third-party machine learning provider 412. Finally, the resolved actionable inference message 430, 432 is sent to the appropriate endpoint (in this example, one car from Avis 404 and one car from Budget 404). Using public key encryption mechanisms by the obfuscators 420, 422 and the generic/common auto resolver 418, the system 400 can effectively obscure identifying data from the cars for machine learning processes, and deliver (resolved) actionable inference back to the appropriate car(s).

Figure 4:
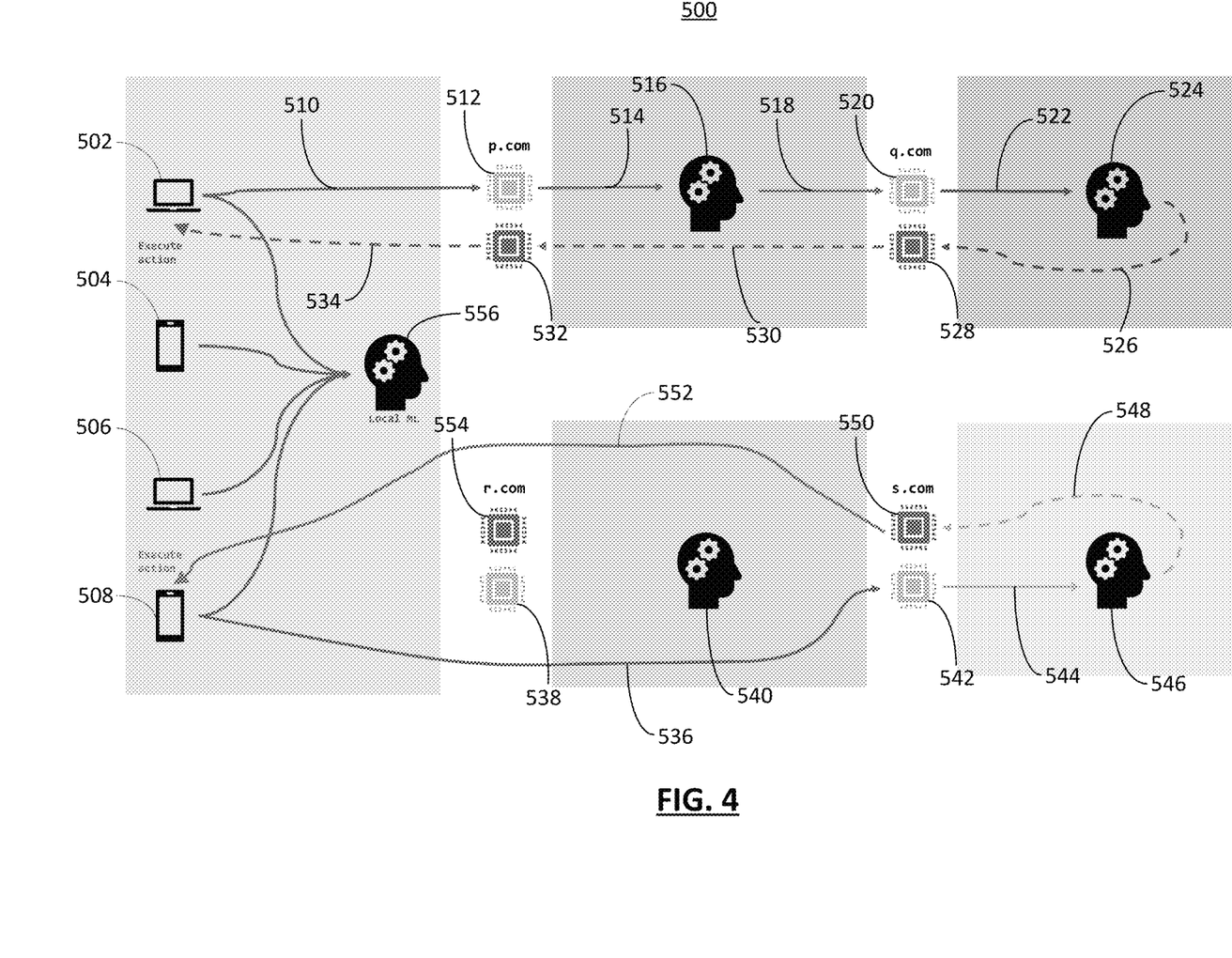
FIG. 4 illustrates, in schematic form, a layered system model for ambiguating and disambiguating data collected for machine learning.

Reference is now made to FIG. 4, which illustrates a layered system 500 model for ambiguating and disambiguating data collected for machine learning.

In some implementations, as shown, the obfuscator module consists of two or more obfuscator modules, where the obfuscator modules are located in two or more layers, and the resolver module consists of two or more resolver modules, where the resolver modules are located in the two or more layers. The layers are denoted by vertical bands between either endpoints and a machine learning module zone, or between two machine learning module zones. The layers, as shown, each have an obfuscator module and a resolver module associated with a specific domain, however, it will be appreciated that some layers do not necessarily need to contain both an obfuscator module and a resolver module, or any module at all. In a second or higher layer the obfuscating module obfuscates selected identifying information in data transmitted from either an endpoint or at least one of the one or more machine learning modules associated with a lower layer, and in the second or higher layer the resolver module resolves selected obfuscated identifying information received from at least one of the one or more machine learning modules associated with a current or higher layer.

In a first example, endpoint 502 transmits data 510 including identifying information and non-identifying information. The data 510 object may have a form like so:

```
struct data {
    A;
    B;
    C;
    D;
}
``` where A, C and D are identifying information, and B is non-identifying information.

The obfuscator module 512 for domain p.com obfuscates selected identifying information in the data 510 to generate obfuscated data 514 including the non-identifying information, obfuscated identifying information, and any identifying information not selected by the current obfuscator module 512. The resultant data object may have a form like so:

```
struct data {
    A;
    B;
    XXC;
    XXD;
}
``` where A is identifying information not selected by the current obfuscator module 512, B is non-identifying information, and XXC/XXD are obfuscated identifying information.

One or more machine learning modules 516 receive the obfuscated data 514 and, in this example of two layers, pass the obfuscated data 514 through as obfuscated data 518 to obfuscator module 520 for domain q.com because the one or more machine learning modules 516 do not have any actionable inferences to provide.

The obfuscator module 520 for domain q.com obfuscates selected identifying information in the obfuscated data 518 to generate obfuscated data 522 including the non-identifying information and obfuscated identifying information. The resultant data object may have a form like so:

```
struct data {
    XXA;
    B;
    XXC;
    XXD;
}
``` where B is non-identifying information, and XXA/XXC/XXD are obfuscated identifying information.

One or more machine learning modules 524 receive the obfuscated data 522 and transmit an actionable inference message 526 based upon the non-identifying information in the obfuscated data 522. The resultant data object may have a form like so:

```
struct inference {
    Action;
    XXA;
    B;
    XXC;
    XXD;
}
``` where Action is an inference-based action/command, B is non-identifying information, and XXA/XXC/XXD are obfuscated identifying information.

A resolver module 528 resolves selected obfuscated identifying information in the actionable inference message 526 and, in this example of two layers, transmits the resolved actionable inference message 530 to a second resolver module 532 for domain p.com. The resultant data object may have a form like so:

```
struct inference {
    Action;
    A;
    B;
    XXC;
    XXD;
}
``` where Action is an inference-based action/command, B is non-identifying information, and XXC/XXD are obfuscated identifying information.

A resolver module 532 resolves selected obfuscated identifying information in the actionable inference message 530 and transmits the resolved actionable inference message 534 to the endpoint 502 associated with the identifying information. The resultant data object may have a form like so:

```
struct inference {
    Action;
    A;
    B;
    C;
    D;
}
``` where Action is an inference-based action/command, A, C and D are identifying information, and B is non-identifying information. At this point, the endpoint 502 executes the action.

In some cases, it would be desirable for the system 500 to obfuscate information in a more fine-grained manner. To this end, information sources (i.e. endpoint(s) and/or obfuscator module(s) and/or resolver module(s)) and machine learning modules may be grouped in layers. Each layer may have visibility to some part of the transmitted data. Since the endpoint(s) originate the data, the origin layer (including any local machine learning providers 556) may have visibility to all of the data. Machine learning modules in a given layer may process data within the layer's visibility. It may be that machine learning modules provide a manifest of the data they must use and can use along with the inferences they can provide. The aggregation of its machine learning modules' manifest can be seen as the data visibility of a particular layer. This may also be the entry criteria for data into the layer. Put differently, incoming data may be required to conform, in terms of content or format, to the machine learning modules' manifest requirements. In this way, a system of layered obfuscation may be constructed of origin layer and a set of layers with manifest defined data visibility. Using machine learning modules with manifests may provide a system that can progressively obfuscate more of the data depending on the machine learning module intended to be used. In some cases, a subsystem may route the data that has been obfuscated to one or more machine learning modules having appropriate manifests (e.g. per some policy). In one example embodiment, a particular (forwarding) layer's obfuscator may adapt the data generated to meet the requirement of a forwarded layer's (machine learning modules) input data expressed in manifest.

In a second example of FIG. 4, endpoint 508 transmits data 536 including identifying information and non-identifying information. The data 536 object may have a form like so:

```
struct data {
    A;
    B;
    C;
    D;
}
``` where A and D are identifying information, and B and C are non-identifying information.

As will be noted, obfuscator module 538 and one or more machine learning modules 540 may be bypassed because the system 500 recognizes that obfuscator module 538 does not provide any needed obfuscating for the current data 536. It may be that the manifest(s) of one or more machine learning modules 540 indicate a requirement for some non-identifying information which is not found in the data 536 object. The system 500 may also recognize that one or more machine learning modules 540 does not provide any needed inferences for the current data 536, as indicated, for example, by the manifest(s) of one or more machine learning modules 540.

The obfuscator module 542 for domain s.com obfuscates selected identifying/non-identifying information in the data 536 to generate obfuscated data 544 including the non-identifying information, obfuscated non-identifying information, and obfuscated identifying information. The resultant data object may have a form like so:

```
struct data {
    XXA;
```

```
        XXB;
        C;
        XXD;
}
``` where XXB is obfuscated non-identifying information, C is non-identifying information, and XXA/XXD are obfuscated identifying information. In this example, it may be that the manifest(s) of one or more machine learning modules 546 indicate a non-requirement for non-identifying information B, and it may be for this reason that obfuscator module 542 obfuscates non-identifying information B into obfuscated non-identifying information XXB.

One or more machine learning modules 546 receive the obfuscated data 544 and transmit an actionable inference message 548 based upon the non-identifying information in the obfuscated data 544. The resultant data object may have a form like so:

```
struct inference {
        Action;
        XXA;
        XXB;
        C;
        XXD;
}
``` where Action is an inference-based action/command, XXB is obfuscated non-identifying information, C is non-identifying information, and XXA/XXD are obfuscated identifying information.

A resolver module 550 resolves selected obfuscated identifying/non-identifying information in the actionable inference message 548 and transmits the resolved actionable inference message 552 to the endpoint 508 associated with the identifying information. The resultant data object may have a form like so:

```
struct inference {
        Action;
        A;
        B;
        C;
        D;
}
``` where Action is an inference-based action/command, A and D are identifying information, and B and C are non-identifying information. At this point, the endpoint 508 executes the action.

As will be noted, resolver module 554 may be bypassed because the system 500 recognizes that resolver module 554 does not provide any needed resolving for the current data 552.

In another implementation, at least one of the one or more machine learning providers 556 is local to a domain of the endpoint 502, 504, 506, 508. Selected data from the endpoint 502, 504, 506, 508 is transmitted directly to the at least one of the one or more local machine learning providers 556, and an actionable inference message (not shown) is received at the endpoint 502, 504, 506, 508 directly from the at least one of the one or more local machine learning providers 556.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of ambiguating and disambiguating data collected for machine learning comprising:
   receiving data from an endpoint, the data including identifying information for the endpoint and non-identifying information;
   obfuscating the identifying information in the received data to generate obfuscated data including the non-identifying information and obfuscated identifying information;
   transmitting the obfuscated data to one or more machine learning providers;
   receiving an actionable inference message based upon the non-identifying information in the obfuscated data from the one or more machine learning providers;
   resolving the obfuscated identifying information in the received actionable inference message to recover the identifying information; and
   transmitting the resolved actionable inference message to the endpoint associated with the identifying information.

2. The method of claim 1, wherein obfuscating the identifying information in the received data includes replacing the identifying information by a token generated using a cryptographic hash.

3. The method of claim 2, wherein resolving the obfuscated identifying information to recover the identifying information includes replacing the token with the identifying information using a stored mapping.

4. The method of claim 1, wherein obfuscating the identifying information in the received data includes replacing the identifying information by an encrypted string generated using one of symmetric or asymmetric encryption.

5. The method of claim 4, wherein resolving the obfuscated identifying information to recover the identifying information includes replacing the encrypted string with the identifying information using a symmetric or asymmetric decryption key.

6. The method of claim 1, wherein the obfuscated data is generated to include a resolving identifier, the resolving being associated with the obfuscating by the resolving identifier.

7. The method of claim 1, wherein at least one of the one or more machine learning providers is local to a domain of the endpoint, and wherein selected data from the endpoint is transmitted directly to the at least one of the one or more local machine learning providers, and an actionable inference message is received at the endpoint directly from the at least one of the one or more local machine learning providers.

8. The method of claim 1, wherein the obfuscating and the resolving occurs in two or more layers, and wherein in a second or higher layer the obfuscating obfuscates identifying information in data received from either the endpoint or at least one of the one or more machine learning providers associated with a lower layer, and in the second or higher layer the resolving resolves obfuscated identifying information received from at least one of the one or more machine learning providers associated with a current or higher layer.

9. The method of claim 8, wherein the obfuscating in a given layer generates obfuscated data adapted to meet input requirements of one or more machine learning providers associated with a higher layer.

10. The method of claim 1, wherein the obfuscating and the resolving occurs at a same layer.

11. A privacy protection system for ambiguating and disambiguating data collected for machine learning comprising:
    an endpoint for transmitting data, the data including identifying information for the endpoint and non-identifying information;
    an obfuscator module for obfuscating the identifying information in the data to generate obfuscated data including the non-identifying information and obfuscated identifying information;
    one or more machine learning modules for receiving the obfuscated data and transmitting an actionable inference message based upon the non-identifying information in the obfuscated data; and
    a resolver module for resolving the obfuscated identifying information in the actionable inference message and transmitting the resolved actionable inference message to the endpoint associated with the identifying information.

12. The privacy protection system of claim 11, wherein the obfuscator module obfuscates the identifying information in the data by replacing the identifying information by a token generated using a cryptographic hash.

13. The privacy protection system of claim 12, wherein the resolver module resolves the obfuscated identifying information in the actionable inference message by replacing the token with the identifying information using a stored mapping.

14. The privacy protection system of claim 11, wherein the obfuscator module obfuscates the identifying information in the data by replacing the identifying information by an encrypted string generated using one of symmetric or asymmetric encryption.

15. The privacy protection system of claim 14, wherein the resolver module resolves the obfuscated identifying information to recover the identifying information by replacing the encrypted string with the identifying information using a symmetric or asymmetric decryption key.

16. The privacy protection system of claim 11, wherein the obfuscated data is generated to include a resolver module identifier, the resolver module being associated with the obfuscator module by the resolver module identifier.

17. The privacy protection system of claim 11, wherein at least one of the one or more machine learning modules is local to a domain of the endpoint, and wherein selected data from the endpoint is transmitted directly to the at least one of the one or more local machine learning modules, and an actionable inference message is received at the endpoint directly from the at least one of the one or more local machine learning modules.

18. The privacy protection system of claim 11, wherein the obfuscator module consists of two or more obfuscator modules, the obfuscator modules located in two or more layers, and the resolver module consists of two or more resolver modules, the resolver modules located in the two or more layers, and wherein in a second or higher layer the obfuscating module obfuscates identifying information in data transmitted from either the endpoint or at least one of the one or more machine learning modules associated with a lower layer, and in the second or higher layer the resolver module resolves obfuscated identifying information received from at least one of the one or more machine learning modules associated with a current or higher layer.

19. The privacy protection system of claim 11, wherein the obfuscator module and the resolver module are collocated at a same layer.

20. A non-transitory computer-readable storage medium storing processor-executable instructions for ambiguating and disambiguating data collected for machine learning, wherein the processor-executable instructions, when executed by a processor, cause the processor to:
    receive data from an endpoint, the data including identifying information for the endpoint and non-identifying information;
    obfuscate the identifying information in the received data to generate obfuscated data including the non-identifying information and obfuscated identifying information;
    transmit the obfuscated data to one or more machine learning processes;
    receive an actionable inference message based upon the non-identifying information in the obfuscated data from the one or more machine learning processes;
    resolve the obfuscated identifying information in the received actionable inference message to recover the identifying information; and
    transmit the actionable inference message to the endpoint associated with the identifying information.

* * * * *